(12) United States Patent
Weyman et al.

(10) Patent No.: US 7,720,066 B2
(45) Date of Patent: *May 18, 2010

(54) SYSTEM AND METHOD FOR DISTRIBUTED MULTICAST ROUTING

(75) Inventors: Raphael J Weyman, Hemel Hempstead (GB); Francisco Aquino, Marlborough, MA (US); Maurice A Goodfellow, Dunstable (GB)

(73) Assignee: 3Com Corporation, Marlborough, MA (US)

( * ) Notice: Subject to any disclaimer, the term of this patent is extended or adjusted under 35 U.S.C. 154(b) by 244 days.

This patent is subject to a terminal disclaimer.

(21) Appl. No.: 11/941,316

(22) Filed: Nov. 16, 2007

(65) Prior Publication Data
US 2008/0069100 A1 Mar. 20, 2008

(51) Int. Cl.
*H04L 12/06* (2006.01)
(52) U.S. Cl. ...................................... 370/390
(58) Field of Classification Search ........................ None
See application file for complete search history.

(56) References Cited

U.S. PATENT DOCUMENTS

| 5,818,838 | A | 10/1998 | Backes et al. |
| 5,920,699 | A | 7/1999 | Bare |
| 6,539,022 | B1 | 3/2003 | Virgile |
| 6,553,028 | B1 | 4/2003 | Tang et al. |
| 6,556,575 | B1 | 4/2003 | Denio et al. |
| 6,570,875 | B1 | 5/2003 | Hegde |
| 6,765,914 | B1 | 7/2004 | Jain et al. |
| 6,785,274 | B2 | 8/2004 | Mahajan et al. |
| 6,807,176 | B1 | 10/2004 | Egbert et al. |
| 6,847,620 | B1 | 1/2005 | Meier |
| 6,934,292 | B1 | 8/2005 | Ammitzboell |
| 7,123,615 | B2 | 10/2006 | Weyman et al. |
| 7,274,703 | B2 * | 9/2007 | Weyman et al. ............. 370/401 |

FOREIGN PATENT DOCUMENTS

| WO | WO 99/00938 | 1/1999 |
| WO | WO 01/41364 | 6/2001 |

OTHER PUBLICATIONS

Passmore, The Virtual LAN Technology Report, pp. 1-21, 1996.
Finn, Ingress Port Map for 802.1Q, Cisco Systems, p. 1-6, 1997.

* cited by examiner

*Primary Examiner*—Frank Duong

(57) ABSTRACT

A distributed router composed of individual units connected by links in a routing fabric which appears to be a single network entity routes multicast packets by bridging to the final unit in the fabric. At the final unit the packet is replicated as necessary and routed. The scheme avoids multiple transmission of the same packet across the fabric.

9 Claims, 9 Drawing Sheets

SYSTEM AND METHOD FOR DISTRIBUTED MULTICAST ROUTING

CROSS-REFERENCE TO RELATED APPLICATIONS

This application claims the benefit of U.S. patent application Ser. No. 10/644,155, entitled "SYSTEM AND METHOD FOR DISTRIBUTE MULTICAST ROUTING" filed Aug. 20, 2003, the subject matter of which is incorporated herein by reference.

FIELD OF THE INVENTION

This invention relates to packet-switched communication networks, particularly though not exclusively those employing media access control (MAC) addressing and network (IP) addressing of packets. More particularly the invention relates to a fabric of units organised as a single virtual multicast router and units intended for or capable of use in such a fabric.

BACKGROUND TO THE INVENTION

It is known, particularly for network switches, to interconnect a multiplicity of network units into a switching 'fabric' so that in effect, and particularly in relation to the external network, the units act as a single network entity. One of the purposes of a fabric of network units is the provision of 'resiliency' that is to say the ability of the switching fabric to continue operation, so far as is feasible, notwithstanding a fault in or removal of one of the units of the fabric or one of the links connecting the units of the fabric. Early forms of such a fabric were in the form of a cascaded ring although more recently mesh type systems have been proposed. It has also been proposed, for example in the prior copending U.S. patent application to Weyman et al, Ser. No. 10/093,506 filed 11 Mar. 2002 (which shares inventors and a common assignee herewith) to provide distributed routing for unicast packets. The distributed routing described in that application, which is incorporated by reference herein, requires the action of routing, which necessarily involves changes in a MAC address, to be performed by the 'ingress' unit, that is to say the unit, within the fabric, which first receives the packet. If the egress port by which the packet leaves the fabric is on a different unit, then after the actions required by routing, the packet would be forwarded by bridging to the unit on which the egress port is located. In this way, although there may be multiple routers in the fabric, only one is involved in the routing of any single packet, there will be only one routing 'hop' and so it will appear to entities outside the fabric as if the fabric contained a single router.

However, the necessary change in the destination MAC address renders such a distributed unicast forwarding scheme unsuitable for routing multicast packets, for which the MAC address should not change within the switching fabric.

Accordingly, a primary object of the present invention is to provide a switching fabric, and units for use within such a switching fabric, which can provide distributed multicast routing.

A further object of the invention is to minimise the usage of bandwidth on links between the units of such a fabric. A yet further object of the invention is to provide consistency and compatibility with bridging fabrics and unicast routing fabrics.

SUMMARY OF THE INVENTION

As will be explained in somewhat greater detail after a presentation of the necessary context for understanding the invention, the present invention in a preferred form allows a symmetrical operation with the units of a fabric participating similarly in a multicast routing functionality. The invention is based on the bridging of multicast traffic to each unit, for example on an ingress VLAN, and thereafter the replication by each unit and local routing so that no replica packets cross the 'cascade', that is to say to the system of links between the units. It is preferable for a 'master' or 'lead' unit in the fabric to run routing protocols and for the other units to synchronise their operation by the action of 'snooping'.

Further objects and features of the invention will become apparent from a consideration of the following detailed description with reference to the accompanying drawings.

DETAILED DESCRIPTION

Synopsis

Figure 1:
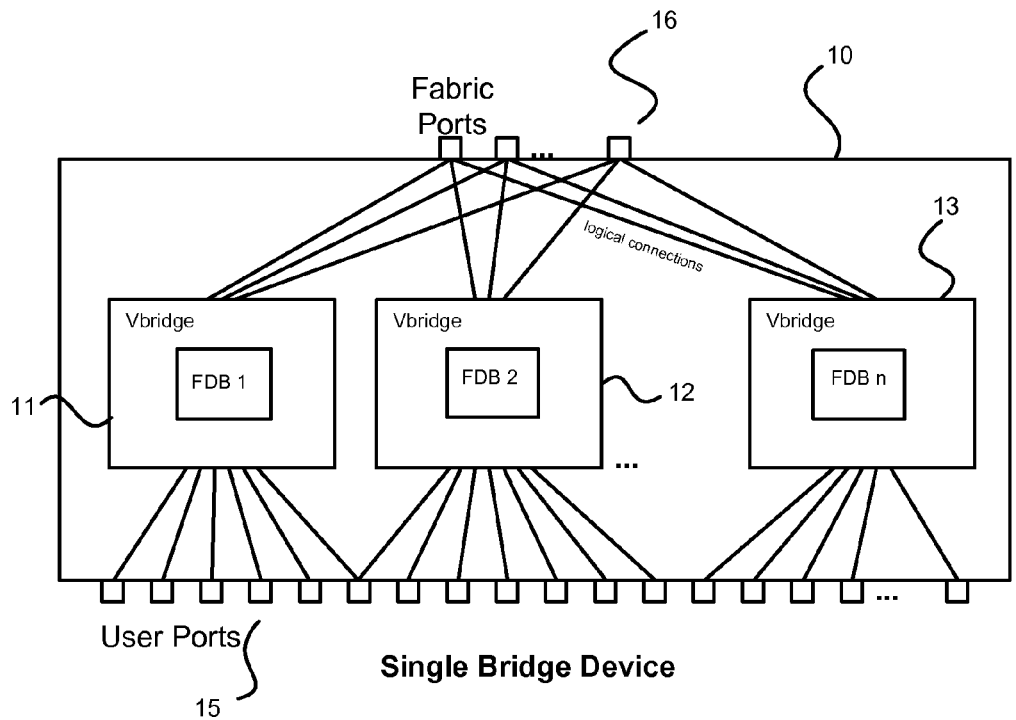
FIG. 1 illustrates a single bridge device.

The following description begins with a discussion of bridging, fabrics and distributed operation, explains the context of distributed routing and proceeds to an explanation of distributed multicast routing according to the invention.

Context

It is generally presumed in the description that follows that the system for the conveyance of packets which have, among other things, media access control (MAC) addresses and IP (network) addresses corresponding to the second or data link layer and third or logical link layer of the OSI Network Model. It also presumed that the physical network has a multiplicity of 'layer 2' domains or sub-nets; for this purpose it may be notionally partitioned into virtual local area networks (VLANs).

When several individual data switching units are connected to form a fabric, their functionalities may be distributed among the individual units in the fabric. It is generally important to allow this distribution to occur so that the entire fabric appears to other entities as if it were a single entity. Ancillary requirements are intended to facilitate the sharing of the workload between the units, to maximise the data forwarding performance and to minimise the dependence on any single unit or connection within the fabric.

The functionalities required of a network unit may be divided into two broad categories. They may be characterised as 'data plane' and 'control plane'. The data plane relates directly to the forwarding of the data traffic, namely the packets, and the control plane relates to the 'overhead' activities of establishing the topology of the network in which the unit is deployed. More specifically the data plane includes the Vbridges, fabric ports, user ports, forwarding databases and forwarding engines. The control plane includes the protocol entities which include, for example, LACP (link aggregation control protocol), STAP (spanning tree algorithm and protocol), IGMP (internet group management protocol), routing protocols and network login. In the following description, there will be an explanation of the requirements which must be met in practice by the data plane and control plane in each device so that when several units are connected through their fabric ports (i.e. ports connected only to other units within the fabric and not to the external network), they will appear from outside the fabric as if they were a single entity.

It needs emphasising that these requirements are stated for completeness and are in fact generally common to fabrics whether they are intended for bridging or routing.

Distributed Bridging Fabric

In order to be able to function as a bridge, a single unit must include at least one 'Vbridge' incorporating a forwarding database and at least two 'user' ports, i.e. external ports by which it can be connected to the external network. By 'Vbridge' is meant herein a network entity of which the primary function is the forwarding of data traffic frames according to its layer 2 (media access control) address. A bridge is fully defined in IEEE 802.1d. Specifically herein 'Vbridge' is used to described a bridge that will forward data only within one VLAN. This is a convenience rather than a necessity for the invention and if for example the network were not partitioned into virtual LANs, the term 'Vbridge' would be coterminous with 'bridge'.

FIG. 1 illustrates a single unit, operating as a bridge, for use in a network 'fabric'. In this example, the unit 10 has three 'Vbridges' 11, 12 and 13, each with a forwarding database FDB 1, FDB 2, etc. Each Vbridge 11, 12 and 13 is connected to at least one and usually more than one of a multiplicity of user ports 15 and all have logical connections to each of at least one and in generally more than one fabric port 16. The term 'fabric port' is used to refer to a port which is only connected to a link internal of 'fabric' of units. Some examples of fabrics are shown in the aforementioned application. Other examples are given in prior co-pending applications of Donoghue et al., Ser. No. 10/067,738 filed 8 Feb. 2002 and O'Neill et al, Ser. No. 10/337,299 filed 8 Oct. 2002, both having a common assignee herewith and incorporated by reference herein.

A multiplicity of single bridge devices units be connected through their fabric ports to form a distributed fabric, as described in the aforementioned co-pending patent applications. A particular manner of control or the discovery of the fabric topology for this purpose does not form any essential part of the present invention. Generally, the maximum number of units in the fabric and the topology of the fabric is dependent on the product itself.

The bridging of data traffic through a distributed fabric has to appear identical to the bridging of data traffic through a single bridging unit. Thus traffic has to be forwarded from an ingress port to an egress port in the same way regardless of whether the ingress and egress ports are on the same unit or are on different units within the fabric. It is also preferable that traffic should be filtered identically regardless of which device has the user ports. If a single unit bridge can control the forwarding of a particular frame directly to an egress port with no 'flooding' to other user ports, then a distributed fabric bridge would not flood the traffic to other user ports.

Figure 2:
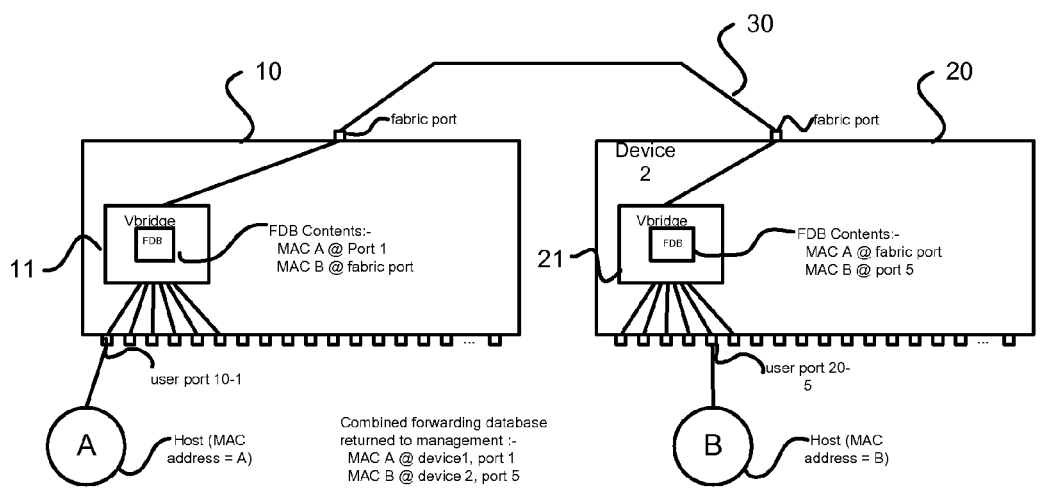
FIG. 2 illustrates a simple fabric composed of bridge devices.

FIG. 2 shows a distributed fabric consisting of two units 10 and 20, each shown with a single Vbridge 11 and 21 respectively, connected by a single fabric link 30. A host A is connected to user port 10-1 on the unit 10 and a host B is connected to a user port 20-5 on the unit 20. It is assumed that host A and host B are in the course of a two-way MAC-addressed communication session and accordingly the distributed bridge, comprising unit 10 and unit 20, that connects them has had an opportunity to learn both the MAC addresses.

Only the traffic flow from host A to host B is shown. This traffic has a MAC source address (SA) of 'A' and a MAC destination address of 'B'. It may be presumed that the traffic flow from host B to host A is similar but proceeds in the opposite direction and with converse addressing of the MAC addresses.

Since the user port to which host B is connected is on unit 20, the Vbridge 11 in unit 10 will forward the traffic only to its fabric port. Unit 10 does not flood the traffic to any of its user ports. When unit 2 receives the traffic from its fabric port, it forwards that traffic directly to user port 20-5 and is not flooded to any other user port.

Fabric Ports

As is used herein, the term 'fabric port' refers to a visible port that is dedicated to the task of connecting a unit to other units within the fabric so as to constitute the distributed fabric of units. A fabric port may not be connected to anything other than a fabric port on another unit within the same fabric. The physical implementation of a fabric port and the number of them available on each unit will vary from product to product. For example, some products may have physically dedicated fabric ports and some of these may be physically unable to be connected to standard user ports. Alternatively, products may have dual-purpose ports that may be configured to be either user ports or fabric ports. The method used to configure dual purpose ports may be by manual specification or may be automatic using some discovery protocol.

Vbridges

As used herein, the term 'Vbridge' is used to describe a bridging entity that will bridge only within a single VLAN. Any Vbridge may be connected to any of the user ports within a unit. Where more than one Vbridge is connected to a particular user port, the traffic (i.e. packets) passing through that port would normally be tagged with a VLAN identifier, such as an identifier according to IEEE 802.1q, so that each VLANs traffic is logically partitioned from the traffic on other VLANs. If however only one Vbridge is connected to a particular user port it would not normally be necessary for the traffic to be tagged with a VLAN identifier for separation.

Since the fabric ports may not be connected to any unit outside the fabric, it does not in general matter what mechanism is used to identify the traffic so that the VLANs carried by the fabric links are kept logically separate. One example is the addition of a VLAN tag according to IEEE 802.1q to all fabric link traffic but other expedients may be employed.

Forwarding Database

Each forwarding database within each unit in a fabric needs to contain, for each MAC address, the identity of the port on which that MAC address was learned, and being the port to which to forward any traffic destined for that MAC address. Within each unit's forwarding database, the port against which a MAC address is learned may be either a user port or a fabric port. If it be a fabric port, at least one other unit in the fabric would have to further forward any traffic destined to that MAC address towards an ultimate user port. In this way, traffic destined for a particular MAC address may be forwarded by several Vbridges within several units, all but the last of the Vbridges in the path being directed by the forwarding database to forward the traffic to a fabric port. Ultimately, the last unit in the path must forward the traffic to a user port an so its forwarding database would have the appropriate user port learned against the MAC address.

Some products, for example the units described in Donoghue et al. supra, have hardware support for the learning of MAC addresses directly against any user port within the fabric, regardless of the unit on which the user port is located. In these circumstances, it would not be necessary to reference the fabric ports in the forwarding databases. An identifier for the user port may be used instead, this identifier being unique within the entire distributed fabric. For example, as described in Donoghue et al. supra, while a frame is within the fabric, it may include a special header which among other things identifies an ingress port and an egress port employing multiple bit words of which the less significant bits identify a port within a unit and the more significant bits identify a unit, so that the special header can identify uniquely within the fabric both a source port and unit and a destination port and unit.

Figure 7:
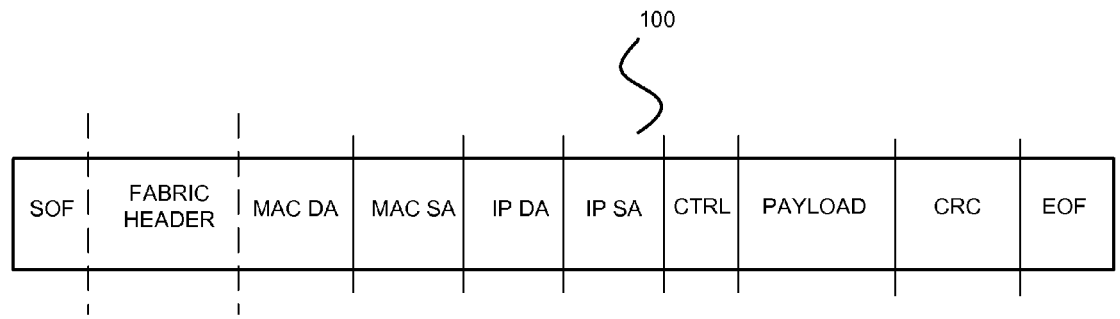
FIG. 7 illustrates a typical packet for use in a fabric according to the invention.

An example of a packet is given in FIG. 7 and comprises a SOF (start of frame), a fabric header, media access control destination and source address (MCA DA and MAC SA respectively), network destination and sources addresses (IP DA and IP SA), various control data (CTRL) including a VLAN header tag and a VLAN identifier, a payload (e.g. user data), a cyclic redundancy code segment CRC and an end of frame (EOF). If the fabric header conforms to that just described it may comprise (as disclosed in the aforementioned application) a source port identification, a destination port identification, a field indicating whether a (single) destination port within the fabric is known for the packet, a source trunk identifier and other fields not particularly relevant to the invention.

Address Learning

It is customary for a forwarding database in a bridge to learn MAC addresses. Thus whenever MAC-addressed traffic arrives at any port of a unit, the unit has an opportunity to learn the MAC source address of the traffic and to populate the forwarding database of the appropriate Vbridge with the MAC address against whichever port may be relevant.

If each unit were to take opportunities to learn MAC addresses independently of the other units in the fabric then in most cases the MAC address would be learnt consistently by all the devices traversed by the traffic. The resultant forwarding databases in each unit would contain entries that are effectively 'synchronised' with each other to allow traffic to be forwarded through the fabric as if the fabric were a single unit. This independent learning towards a consistent set of forwarding databases is called herein 'implicit' synchronisation. However, other mechanisms are available if implicit synchronisation is insufficient.

One is for the fabric to employ additional ARP requests, which are, as those skilled in the art know, employed when a destination address is not present in a forwarding database. ARP replies to ARP requests may be forwarded to every device in the fabric and therefore can be used to support implicit synchronisation. It would be desirable, to avoid excessive flooding of routed traffic, that any MAC addresses that are present both in a forwarding database and a layer 3 ARP cache would not be aged out from the layer 2 forwarding database. This would allow learning opportunities presented by the additional synchronisation support mechanism to remain valid. Furthermore, if there is any flushing of the layer 2 forwarding database, for example following a spanning tree topology change, the additional synchronisation support mechanism should be activated to allow the layer 2 forwarding database to be re-populated.

A second mechanism which may be employed is 'explicit' synchronisation. This is specifically described, for example, in Furlong et al., Ser. No. 09/661,159 filed 14 Sep. 2000 and commonly assigned herewith. Explicit synchronisation, as described in that application or otherwise, can be achieved by each unit letting all other units know about addresses that it has in its forwarding databases. This is relatively simple and does not require any particular hardware support but has the disadvantage that if the forwarding databases were large there would be a large information exchange.

Aggregated Links

It is possible for a host to be connected to a multiplicity of units in a fabric by means of an aggregated link, which comprises a multiplicity of physical connections constituting a single logical connection. Although connection of a host to a plurality of units in a fabric is feasible with systems according to the invention, care must be taken to cope with the operational complexities arising from the aggregation. For example, for the purpose of transmitting and receiving protocol data frames on an aggregated link where the protocol considers the aggregated link to be a single logical link, each unit in the fabric needs to be coordinated so that protocol frames are handled consistently. This may be achieved by nominating an 'owner' unit for each aggregated link and to allow only that unit to process protocol frames to the aggregated link. Further, there needs to be coordination between the units so that where the aggregated link has member ports on more than one unit in the fabric, there is coordination between the units so that each traffic stream is forwarded to the aggregated link consistently regardless of which unit is forwarding to it. In particular, a frame should be forwarded to only one member port of the aggregated link and where traffic has arrived from the aggregated link it should not be forwarded to another port on the same aggregated link. This could be accommodated by tagging of packets within the system, for example using a trunk tag scheme as described in U.S. Pat. No. 6,463,479 issued 8 Oct. 2002 to Jennings et al.

Control Plane

Since a distributed fabric has the appearance to other entities of being a single entity, units in the fabric need to implement control protocols as a single position in the network topology only once though several units within the fabric may cooperate to share the implementation of a particular protocol. Furthermore, it is generally desirable that traffic connectivity should be recovered quickly if any unit or fabric link should fail. If a protocol is implemented in only one unit within the fabric, it is desirable for an implementation to share the protocol state information amongst all devices in the fabric in order to restore operation in the event of the failure of a 'master' unit.

These considerations are mentioned by way of completeness but are not directly relevant to the present invention. Methods by which devices can be elected as a master unit for a fabric and for the re-election of other units in the event of the failure of a master unit are described in prior copending application of Weyman et al., Ser. No. 10/195,503 filed 16 Jul.

2002, having inventors common to the present application and being commonly assigned herewith.

Distributed Resilient Routing Model

The foregoing is given essentially by way of introduction to the subject of packet routing in a distributed fabric. In the next part of this description, there is a description of distributed resilient routing of unicast packets, partly to indicate the problem which the present invention resolves and partly to provide support for a system which not only can provide multicast routing according to the invention but, as is obviously desirable, is compatible with distributed routing of unicast packets.

In a fabric of network units, distributed routing will occur when a packet which needs to be routed enters one unit in the fabric but is required to leave by way of a different unit in the fabric. In such an event the packet should be routed only once and should not be routed again as it enters each unit. In this manner the fabric of units appears as one large distributed router to the user and the external network.

A preferred scheme for distributed unicast routing comprises routing a packet in the source unit (i.e. the unit having the ingress port on which the packet is received into the fabric) and thereafter to bridge the packet to the egress port. In practice this requires that every unit in the fabric must be able to route packets received on its user ports equally to any other unit in the fabric. This can be accomplished by maintaining in each unit the same routing information base (RIB). The RIB may be synchronised between the devices by the distribution of any routing configuration information, such as IP addresses, static routes, etc to all the other units in the fabric. Routing information derived from the running of routing control protocols, such as OSPF and RIP, also needs to be distributed to all the units in the fabric.

Figure 3:
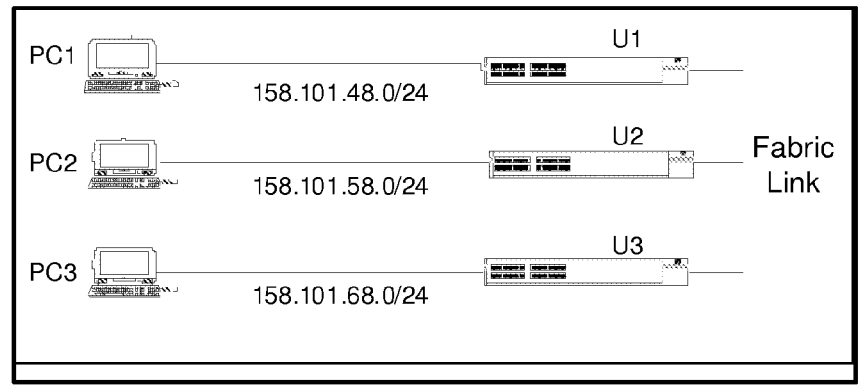
FIG. 3 illustrates a routing system.
Figure 4:
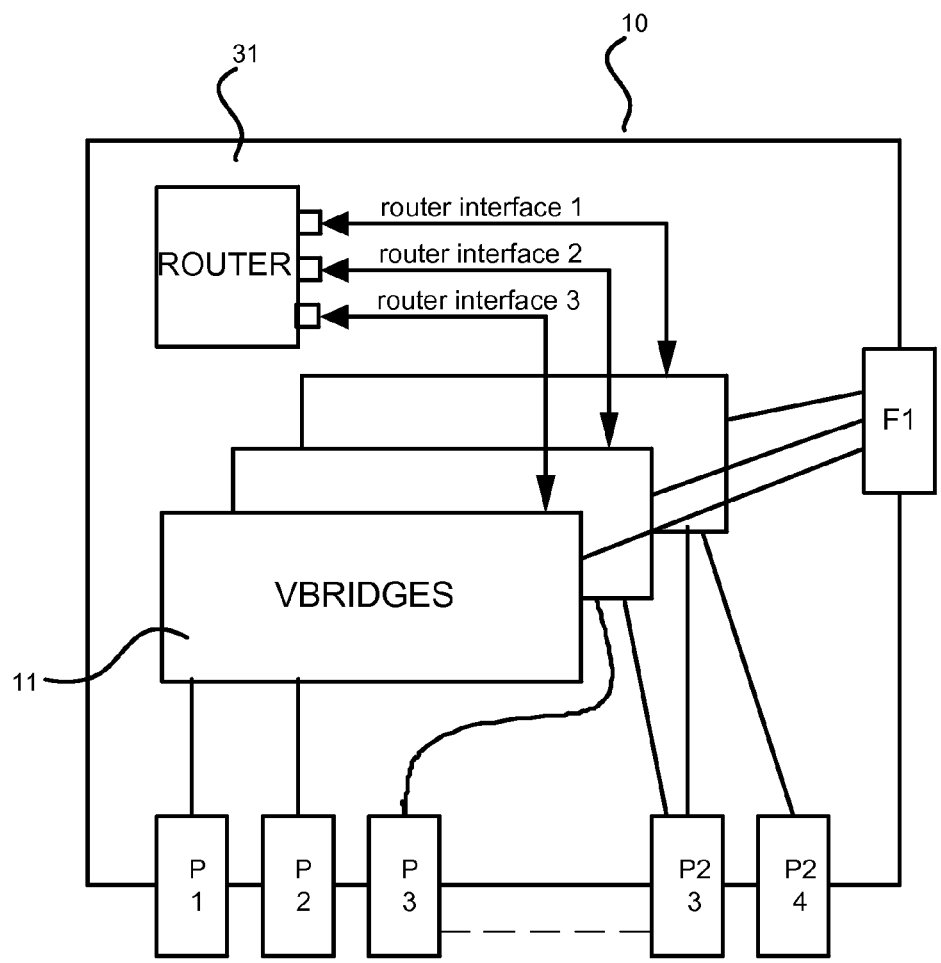
FIG. 4 illustrates a single router unit.

An example of distributed unicast routing is shown in FIG. 3 wherein three users PC 1, PC 2 and PC 3 are connected to units U 1, U 2 and U 3 which are formed into a fabric by means of a fabric link. It may be supposed that user PC 1 needs to communicate with user PC 3. A packet generated by user PC 1 and destined for user PC 3 would be routed by unit U 1 and bridged to user PC 3 by unit U 3. A response packet from user PC 3 will be routed by the unit U 3 and bridged to the user PC 3 by way of unit U1. In each case the packet is routed only once, by the unit via which the packet entered the fabric, bridged to the egress unit and to the egress port. FIG. 4 shows a rather simple fabric and in practice, particularly if the fabric is a mesh, the packet may traverse one or more units within the fabric before it reaches the unit containing the egress port. In such a case the packet is bridged to the intervening units as well as to the destination unit.

Routing Data Plane

FIG. 4 illustrates a unit 10 which has a multiplicity of Vbridges, such as the Vbridges previously mentioned, user ports 15 to which the Vbridges 11 are variously connected, a fabric port 16, to which all the Vbridges are connected, and a router 31 having a respective router interface coupled to each of the Vbridges.

All the router interfaces defined in the fabric would be created for every unit in the fabric. The VLAN numbering, IP address, IP mask and MAC address configuration of each router interface would be made the same for all the units of the fabric. This can be achieved using the mechanisms described in Weyman et al, Ser. No. 10/093,506 supra.

Thus with reference to FIG. 4, a packet received on one of the user ports P1 to P24 and needing to be routed would be delivered to the router by the receiving Vbridge on the router interface attached to that bridge. A decision to deliver the packet to the router is determined when the destination MAC address of the packet matches that of router interfaces.

Since, as described by Weyman et al in Ser. No. 10/093, 506, supra, the MAC address of a router interface is the same on every unit, each unit can make the same determination. After the router has performed its routing operation it will deliver the packet to the bridge associated with the outgoing router interface. If the bridge is aware, from the destination MAC address in the packet, that the egress port is on the local unit (i.e. one of ports P1 to P24), the packet will be forwarded by bridging to this local port. If from the destination MAC address the egress port were on another unit, the packet would be forwarded to a fabric port (F1 in this example). If the bridge does not know where the egress port is, it will 'flood' the packets to all the ports on the local unit, that is to say the user ports and the fabric port.

Figure 5:
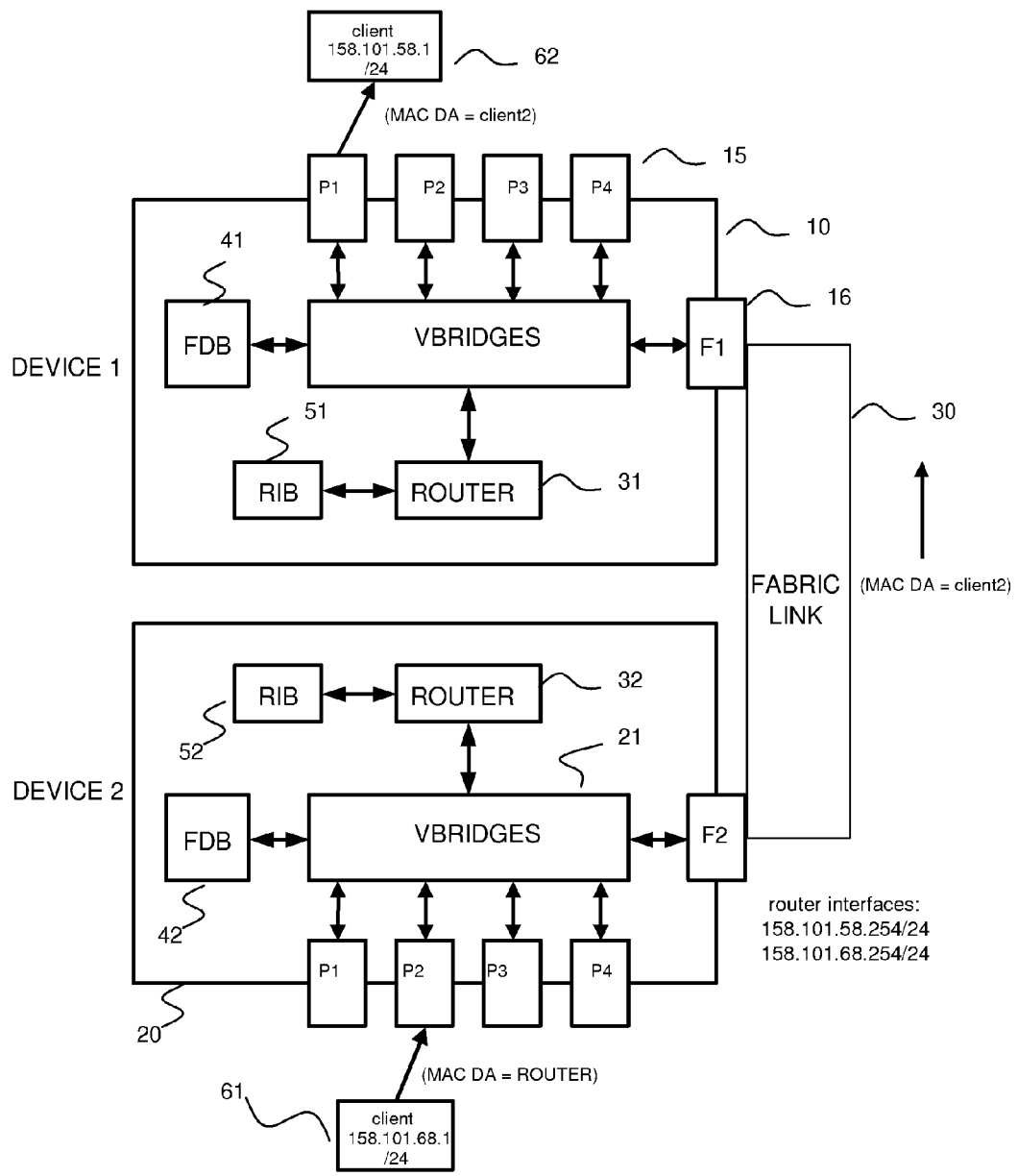
FIG. 5 illustrates a simple fabric.

FIG. 5 illustrate this operation in greater detail. The fabric in this example consists of units 10 and 20 and link 30. The unit 10 has fabric ports P1 to P4, a fabric port F1, a router 31, forwarding database 41 and a routing information base 51. Unit 2 has user ports P1 to P4, a fabric port F2, bridges 21, a router 32, forwarding database 42 and a routing information base 52.

A client 61 is connected to port P2 on unit 20 and a second user 62 is connected to port P1 on unit 10. In this example the client 61 is connected to network 158.101.68.0/24 and desires to send client2 a packet. Since client 62 is on a different network, indicated as 158.101.58.0/24, client 61 must forward the packet to its configured gateway. It is assumed that the routing tables contained in the routers 31 and 32 have been synchronised. It is also assumed that the forwarding databases on the units are synchronised and the port connected to client 62 has been learned in forwarding database 41.

Client 61 creates a packet destined for the IP address 158.101.58.1, namely the IP address of the client 62 but with the MAC address of the distributed router as the link layer destination. This packet is received on P2 of unit 20. Since the destination MAC address on the packet is that of the distributed router, the receiving bridge 21 will deliver the packet to router 32 on the attached router interface. Router 32 will change the destination MAC address to that of client 62 and change the source MAC address to that of the distributed router, decrement the time to live count and make any other modifications normally required by the routing operation.

After the routing operation, the outgoing router interface for the packet will be 158.101.58.254. Router 32 will deliver the packet to the bridge attached to this router interface. Since the MAC address of client 62 is being learned on unit 10, the packet will be forwarded by bridging to the fabric link 30. Unit 10 will receive the packet on its fabric port F1 and, based on the destination MAC address of client 62, it will forward the packet by bridging it to port P1 connected to client 62.

Routing Control Plane

For the routers to operate as a single distributed router every defined router configuration should be identical on all units in the fabric. Preferably the configuration is stored in non-volatile storage in all the units. If the system can accommodate the addition or removal of units, then when a unit with a default configuration joins the fabric, it needs to update its configuration to that of the distributed router. If a unit with a non-default configuration joins the fabric then there should be a selection mechanism which determines the distributed router's configuration. This may be as simple as selecting the lowest numbered unit to provide the configuration. Alternatively, the fabric could be configurable through a priority system.

If the configuration of the router is changed changes should be made on all the units in the fabric.

As previously mentioned, in a system as described it is desirable that all the units in the fabric use the same MAC addresses for the router interfaces. These MAC addresses would be given out as the router's MAC address responding to ARP requests, are used to select received packets for unicast routing and are used as the source MAC address for routed packets. It is preferable that one of the units currently in the fabric should provide the MAC addresses. If the device that is supplying the router MAC addresses for the distributed router fails then one of the other units would need to supply new router MAC addresses. For this purpose, gratuitous ARP broadcasts may be sent out to inform all the neighbouring network units about the change in router MAC addresses. To ensure that all hosts receive these gratuitous requests, it may be desirable to send out multiple ARPs over a period of time.

Control Protocol Redundancy

Routing protocols normally comprise a listening function that receives router protocol packets to build up the protocol's routing tables and an advertising function by means of which a router informs other routers, by way of routing information packets, the networks it can reach. How the routing tables are built up depends on the particulars of the routing protocol. However, it is not desirable for a distributed router to duplicate advertisements to its neighbouring devices. It needs to appear to those neighbours as if it were a single router. This appearance can be achieved by causing only one device in the fabric to provide the advertising function of the protocol. The device that provides the advertising function could be a considered a 'lead' or 'master' or device for that protocol and the other devices in the fabric would be considered subordinate or slave devices for the protocol.

In a distributed router, any number of units may participate in the listening function of the protocol but if the protocol requires these packets to be acknowledged then only one acknowledgement should be generated by the fabric.

If one or more units in the fabric fails, the remaining units should continue to operate as a single distributed router. For this purpose it is preferable to enable every slave device to become a master for the protocol in case of the failure of the master unit, as described by Weyman et al. in Ser. No. 10/195, 503, supra. So that a transition from a slave unit to a master unit should occur quickly and with a minimal distribution to both a protocol and to routed traffic, protocol state and routing data from the master unit should be synchronised in all the slave units.

It will however be appreciated that any synchronisation between units of the routing protocols will occupy bandwidth in the fabric links. To minimise the bandwidth used for synchronisation over a fabric link, the routing information base used for routing can be kept synchronised by allowing the routing protocols to run on each device. For example a router in the neighbourhood but not in the fabric shown in FIG. 6, sends a protocol packet (such as an RIP advertisement) to unit 20 through one of that unit's user ports. In this example each unit (10, 20) in the fabric listens to the protocol. The protocol packet received by unit 20 is sent to its fabric port so that unit 10 can receive it. The protocol process in unit 20 will receive the protocol packet and update the unit's RIB table 52 accordingly. The same procedure would be repeated for device 10. After the protocol packet is received and processed by both devices the derived routing information bases will be equal. This keeps the routing information bases on each device synchronised without requiring the direct exchange of table entries.

Address Resolution Protocol (ARP)

As mentioned previously, the router interfaces would have the same IP addresses and MAC addresses for all units so that any unit would respond equally well to ARP requests for the IP address of a router interface. Since ARP packets are broadcast at 'layer 2' all units in the fabric can receive an ARP request. To avoid multiple redundant responses being generated, only one unit in the fabric should respond to the ARP request. It is possible to organise an election of a 'master' or 'lead' unit to respond to ARP requests or, for example, to arrange for a device that actually receives an ARP request on a user port to be the device that generates an ARP response.

To allow ARP caches in each unit to synchronise all the units preferably perform ARP gleaning on all the ARP requests and responses that they receive. If for some reason an ARP packet is missed by one of the units and the ARP caches lose their synchronisation, there is no serious consequence because the unit with the missing information would generate an ARP request if the relevant address were needed.

Routing Protocols

Various routing protocols may be employed by a distributed router. One example is routing information protocol (RIP) which is a comparatively simple distance vector routing protocol. It is desirable that although every unit may participate in the reception of RIP protocol messages only one unit in the distributed router should generate the RIP advertisements and only one unit in the fabric should provide a reply to RIP advertisement request messages.

ICMP

The ICMP protocol is an integral part of internet protocol. ICMP messages typically report error in the processing of packets and provide information on the delivery of packets. Again, it follows from the strategy of making the fabric appear as a single router that ICMP requests directed at one of the router interfaces are answered by only one unit in the fabric. It is preferable that any unit in the fabric can send ICMP echo request messages through any active IP interface. If a unit sends an echo request message from a router IP address, the echo response will be addressed to that router interface. To allow the requesting device to see the ICMP echo response, packets addressed to the router interfaces should be received by the unit and should also be sent to the fabric port.

ICMP request and response messages conventionally carry an identifier field that is used by echo requesters to match the response to the request. In a distributed fabric all the units receive ICMP responses addressed to a router interface. To allow ICMP echo responses to be processed properly by the distributed fabric, identifiers that are provided in a generated echo request message should be unique within the distributed router.

System Resilience

The purpose of resilience in a distributed router is to allow traffic between the network units to remain with minimal interruption after the failure of a device in the fabric or after the failure of a link between devices in the fabric. In the foregoing it has been described how a distributed router maintains resilience for its active routing protocols, with reference to the earlier co-pending applications which are incorporated by reference herein. This resilience allows a distributed router to continue routing. To enable resilience throughout the network the network units connected to the distributed router should preferably be configured with redundant physical links to the network that form the distributed router. Depending on the configuration employed by the administrator, different levels of resiliency can be provided for different devices. In general there is a trade off of ports against resilience. The more resilient the configuration the fewer additional ports are achieved by the stacking of routers.

The provision of resilience in a distributed fabric is fully by Weyman et al. in the prior copending application Ser. No. 10/195,503, supra. That application also describes in considerable detail a corresponding state machine which enables the re-election of a master unit in a fabric for which connectivity has been at least temporarily lost. However, for present purposes a simple example is described with reference to FIG. 6.

Figure 6:
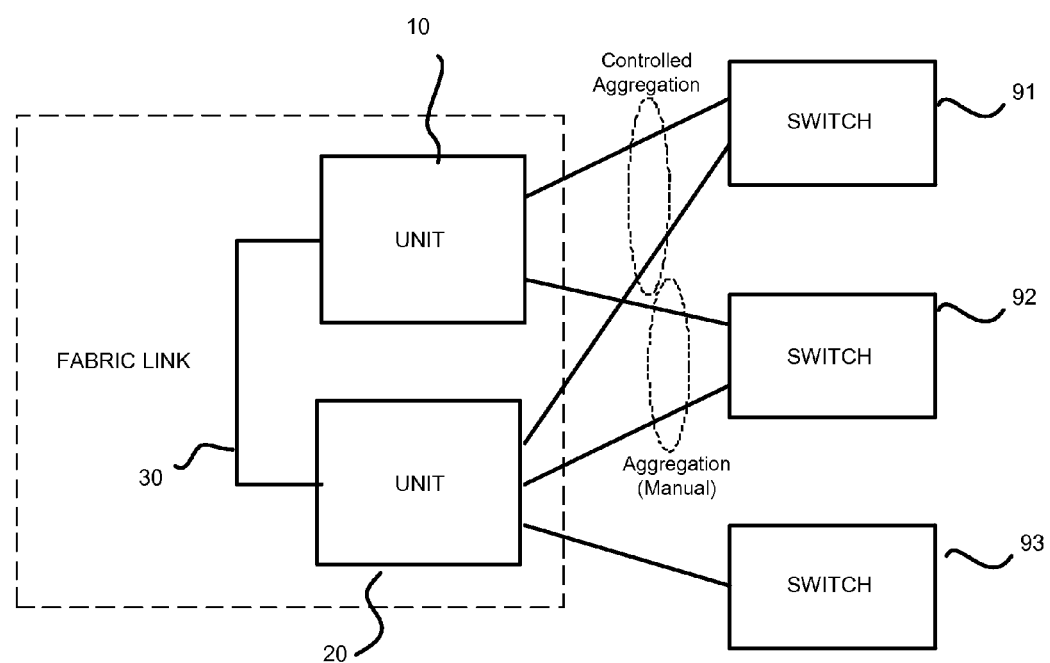
FIG. 6 illustrates aggregation.

In FIG. 6, a distributed router is formed as before by unit 10 and unit 20 connected by a link 30. An external switch 91 has a link aggregation to both unit 10 and unit 20. An external switch 92 has an aggregated link connected to unit 10 and unit 20 and a switch 93 has just a simple link to unit 2. It will be supposed that switch 10 uses a link aggregation control protocol to create an aggregation; the links in switch 2 have been configured manually.

In this example if unit 20 fails then switch 93 loses connectivity to the rest of the network. If the fabric link 30 between unit 10 and unit 20 fails, the link aggregation control protocol running on switch 91 would detect that it is now connected to two separate units and would convert the aggregation into two separate links. This would allow connectivity between units 10 and 20 and switch 91 to be maintained. However, switch 92 could not detect that the fabric had fragmented and would maintain the aggregation at each end. Since in this case units 10 and 20 are no longer connected by the fabric link they could not maintain the aggregation. Because of this there would be no connectivity between the fragments and the switch 93.

To avoid this, it is preferable that manual (non-LACP) link aggregation should not be used on the links between an external network unit and multiple units within the fabric. It should be said that such links do not prevent the network from working normally; the significance is a loss of redundancy which provides resilience to failure. It will be appreciated that by adding resilience to the control protocols and to the paths between a distributed router and attached network devices there is a potential of having two identically configured routers attached to the network. After, for example, a failure of the fabric link each of the devices would believe the other device had failed and would try to assume responsibility for operating all the configured router protocols. However, techniques exist for avoiding this are fully described by Weyman et al. in Ser. No. 10/195,503, supra.

Distributed Multicast Routing

Introduction

It will be presumed in what follows that a distributed multicast router will be compatible with the distributed unicast router previously described. The consequences of that assumption are that a unit that is able to support a distributed router will have its bridging functionally distributed, that Vbridges are distributed and fabric links are able to carry logically separated traffic for all VLANs that may be provided. Furthermore, it will be presumed that the time to live count of each data packet will be decremented no more than once in the distributed fabric, the collection of routers is managed as a single multicast router, and each unit within the fabric would be able to route multicast packets that it received. It is preferable, in order to provide resiliency, that if any unit or arbitrary group of units in the fabric should fail, the remaining units would continue to route between all the router interfaces that have remained active, that is to say those router interfaces with connectivity to VLANs that have user ports on the remaining units. It is also desirable that a data packet should traverse each fabric link no more than once (if at all) and that replicas of a data packet should not traverse any fabric link.

Data Plane

As described in the foregoing, if the traffic is unicast, a routing operation is performed by only one of the units and is not performed by any other unit traversed by the data traffic. The unicast routing described in the foregoing achieves this end by causing the first unit that receives a data packet within the fabric to route that packet and to change its destination MAC address accordingly. When the destination MAC address is changed, the destination MAC address of the packet no longer refers to a router interface owned by the fabric. In this manner no other unit that the packet traverses will attempt to route the packet and instead bridges the data packet onwards towards the egress port by which the packet leaves the fabric for its ultimate destination in the external network. Since, as previously described, all the router interfaces are synchronised, it does not matter to external network entities which unit within the fabric should route a packet because the routing operation is identical irrespective of the unit that performs routing.

However, the 'route then bridge' technique for the distributed unicast router cannot be used for multicast traffic. For such traffic, the destination MAC address does not change as the traffic is routed. Accordingly, if a 'route then bridge' scheme is used, some additional functions are required to prevent each replica packet from being routed by more than one unit. The present invention solves this incompatibility and is based on a forwarding technique which can be summarised as 'bridge/replicate/route'.

As part of its normal operation, a multicast router is required to replicate each data packet to create a replica which can be routed to each of the router interfaces that might require to forward such a replica. For each data packet received by the fabric a distributed multicast router should not require more than one data packet to traverse each fabric link. Either the original data packet may traverse each fabric link or one of the replicas may traverse each fabric link after having been routed. It is not for example desirable for one unit to perform all the required replication and routing of a data packet and then to require each of the replicas to traverse a fabric link towards its egress user port. To operate in this manner would be an unnecessary burden on the finite bandwidth of the fabric links. Accordingly, it is desirable that each unit in the fabric can perform all the replication required in order to be able to forward multicast traffic.

The distributed unicast router described in the foregoing would not require any routed data packet to traverse a fabric link if it were not required to do so in order to reach its egress port. A distributed multicast router should behave similarly in that it should not forward traffic across any fabric link unnecessarily. Since each unit may be required to forward multicast address traffic by replication and routing rather than by bridging, this needs to be taken into account in a determination whether a particular stream should traverse a fabric link. In particular both layer 2 (bridging) and layer 3 (routing) requirements need to be taken into account before a determination that a particular multicast-address stream may cross a fabric link.

Figure 8:
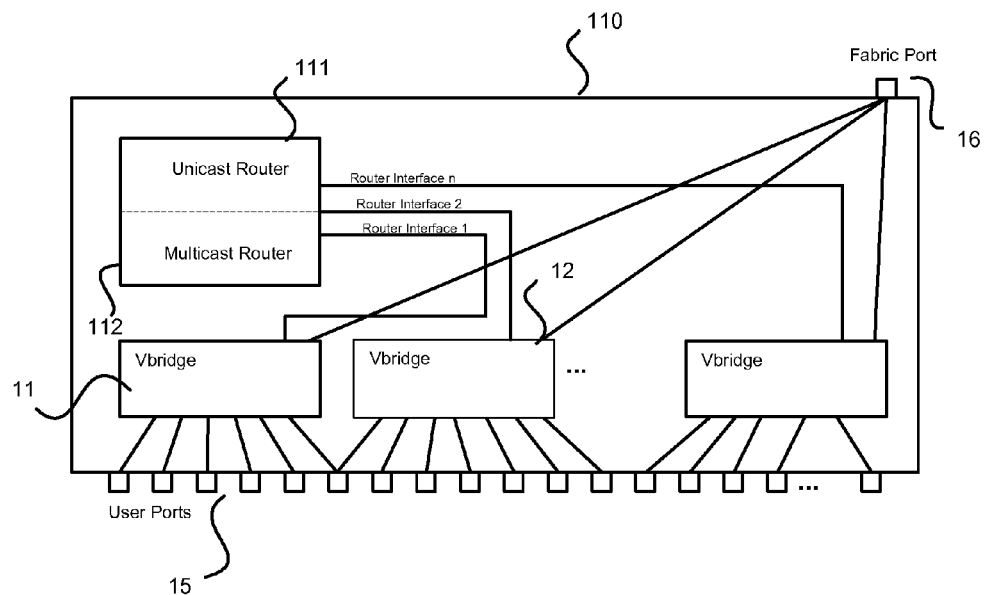
FIG. 8 illustrates a network unit according to the invention.

FIG. 8 shows schematically the structure of a network unit 110 for use in a distributed routing fabric according to the invention. The unit in FIG. 8 comprises a plurality of Vbridges 11, 12 etc each of which is connected to at least one and preferably a multiplicity of the user ports 15 and to each fabric port 16, of which only one is shown for convenience. Each V-bridge is coupled by way of a respective router interface to both a unicast router 111 and a multicast router 112. The multicast router 112 has the same router interfaces as the unicast router and in the example is shown as occupying the same position as the unicast router relative to the Vbridges.

If the unicast router is a distributed router as described in the foregoing, the router interfaces must be synchronised among the devices in the fabric. Since the multicast router shares those same router interfaces with the unicast router, the multicast router will also have synchronised router interfaces.

The multicast router may have a maximum of one router interface for each Vbridge. If the unicast router were configured to have more than one interface to a Vbridge, it would be necessary to specify a particular interface for use by the multicast router.

Forwarding Control

Mere routing of multicast traffic controls the forwarding of traffic between a router's interfaces. The multicast routing operation itself does not control the forwarding of traffic within a VLAN. If therefore no additional controls were present, a Vbridge would flood all multicast address traffic within a VLAN.

Many modern bridges have IGMP (internet group management protocol) snooping functionality that controls the bridge's forwarding of IP multicast address traffic within a VLAN. It is preferable, in order to control traffic within a VLAN, that a Vbridge monitors the IGMP traffic in order to determine which user ports connect to a client of a particular multicast stream. Accordingly the snooper must also determine which user ports are connected to other multicast routers. The Vbridge must then forward each multicast stream to each user port that connects either to another multicast router or to a client of that stream, and the Vbridge should filter the multicast stream from all other user ports.

Figure 9:
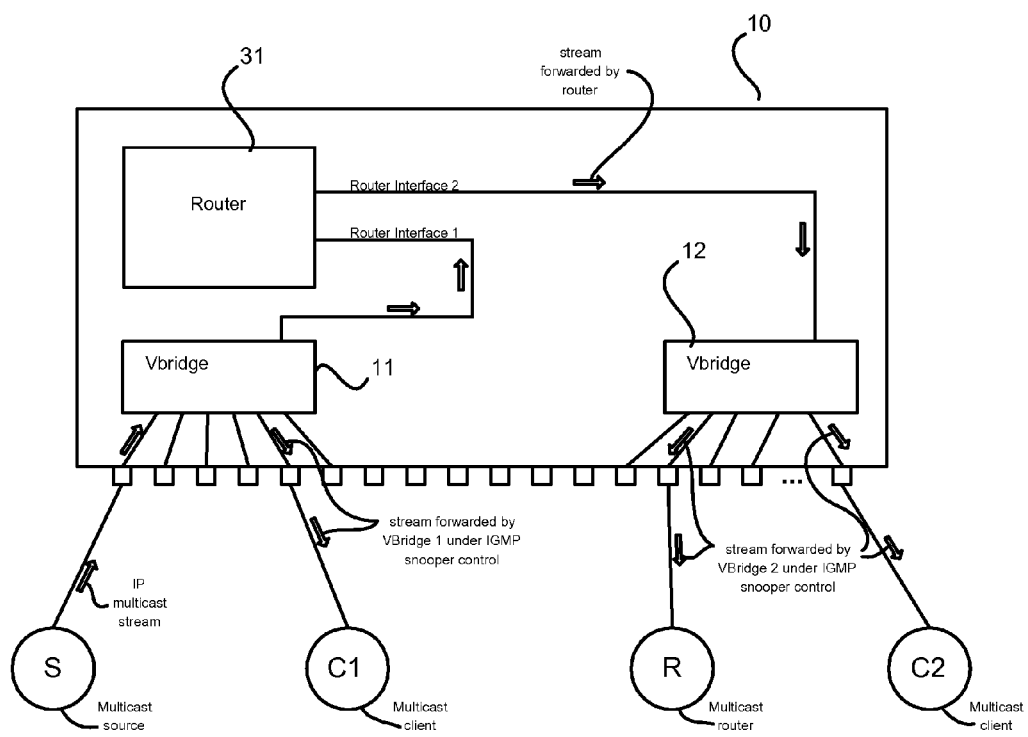
FIG. 9 illustrates the operation of a unit according to FIG. 8.

FIG. 9 illustrates an example of a single multicast router with two Vbridges. A multicast stream source S is connected to Vbridge 11 and is forwarded by Vbridge 11 to a user port to which a client C1 for the stream is attached. The stream is also forwarded to the unit's internal router 31. The control of forwarding within an VLAN using a forwarding table derived by the IGMP snooper prevents Vbridge 11 from forwarding the stream to any other user ports. The router has forwarding tables populated by its control plane. In this example it may be presumed that the forwarding tables indicate that the stream must be forwarded on to router interface 2, which is connected to Vbridge 12. This Vbridge then forwards the stream to the connected multicast router R and another client C2 for the stream. Owing to the control information provided by IGMP snooping, Vbridge 12 does not forward the stream to any other user ports.

Multicast Forwarding Tables

The control plane of the multicast router, including the multicast routing protocols, is used to create and maintain various tables. These are likely to include:

(1) For each routing interface, a list of neighbouring multicast routers;

(2) for each multicast source, the interface on which streams from this source should be accepted;

(3) for each source/group pair, the router interfaces for which this is the designated router, the number of routers that are downstream of each interface for which this is the designated router and whether each of these routers is pruned from the forwarding tree; and whether there is any locally attached member of the group.

The actual tables maintained by the control plane would depend on whichever multicast routing protocol is in use. In general, the control plane must present a composite forwarding table to the data plane of the multicast router. This composite forwarding table will provide, for each multicast source and destination group pair, the rule by which the router's data plane must forward or filter the stream.

The forwarding table used by the data plane needs to include, for each source/group pair, the router interface on which to accept the stream and the router interfaces to which to forward the stream. It follows that the stream must not be routed if the stream is received on any other router interface and the stream will not be routed to any other router interfaces that are not specified.

In a practical embodiment the multicast router may combine the control plane and data plane tables but their separation is useful for understanding them.

Bridge Forwarding Tables

Within the bridges the control plane, which includes the IGMP snooper, would present to each Vbridge a forwarding table to control the forwarding of IP multicast addressed traffic within each VLAN. This forwarding table needs to include, for each Vbridge and for each multicast group within each Vbridge the ports to which to forward traffic for that group.

Again, a specific embodiment of the IGMP snooper may combine the data plane tables with any tables required by the control plane.

Distribution

As indicated in the foregoing, when multiple units containing a multicast router are connected together to form a distributed fabric, the fabric's multicast routing functionality must appear to entities outside the fabric to be identical to that of a single unit.

Furthermore, a fabric containing a multicast router needs to minimise its use of the fabric link or links. It is very preferable that if a multicast stream may reach all the required egress ports without traversing a fabric link then it should not traverse that fabric link. If the multicast router is required to replicate a stream onto a multiplicity of router interfaces, the replicas should not traverse any fabric links.

In order to satisfy these requirements, the multicast router within each unit should perform all the necessary replication locally in order to route multicast traffic to any of the user ports residing on that unit. Since each unit must perform the replication locally, it follows that each unit must also route each replica locally.

For the distributed unicast router it was a requirement that each data packet be routed by only one unit in the fabric. The requirement for the distributed multicast router is similar, but since a multicast stream may be replicated many times, the requirement needs to be modified. For the distributed multicast router each replica should be routed only by one unit in the fabric although different units may route different replicas of the same multicast stream. In order to comply with the requirement that a unit must replicate a stream locally for its own user ports and with the requirement that each replica may be routed only once, the multicast stream must be bridged between the units within the fabric.

Figure 10:
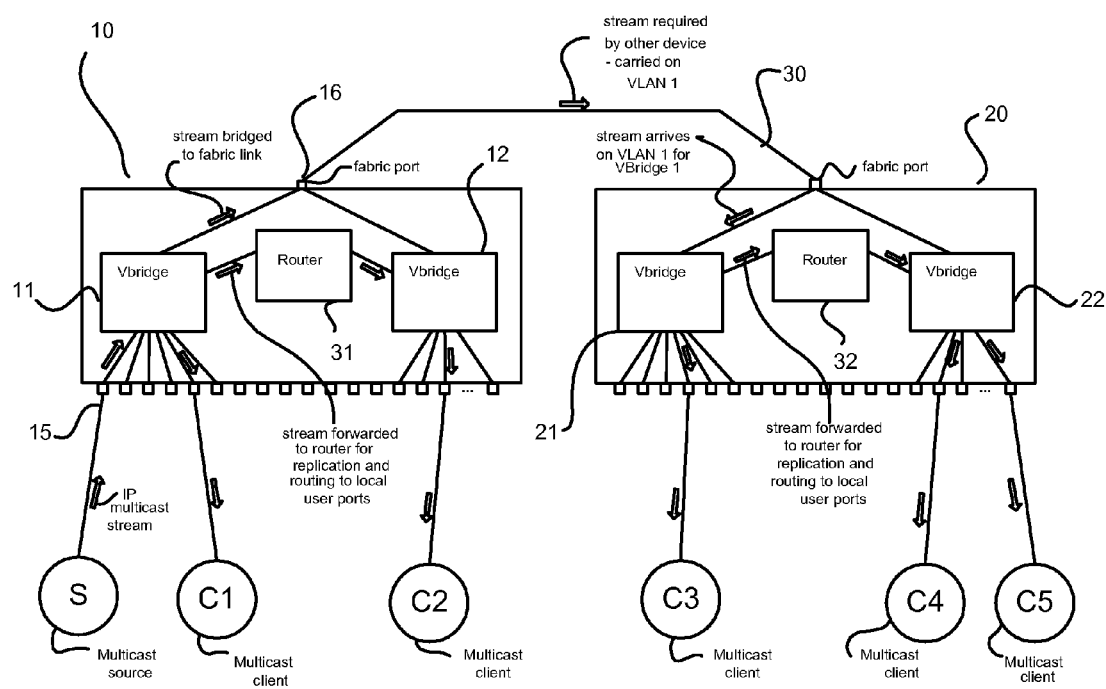
FIG. 10 illustrates a routing fabric.

FIG. 10 represents one embodiment of a distributed multicast router according to the invention and demonstrates the forwarding of a particular multicast stream through a distributed fabric consisting in this example of the two units 10 and 20 and link 30. A source S of the multicast stream is directly connected by way of a user port on unit 10 to Vbridge 11 in unit 10. A multicast client C1 is also directly connected to the Vbridge 11 and accordingly the stream is directly bridged to the user C1 from the multicast source S. The stream is also bridged to the fabric port 16 and to the multicast router 31 in unit 10.

The multicast router within unit 10 replicates (in a manner known per se) and routes the stream to Vbridge 12 for forwarding to multicast client C2.

The stream having been bridged to the fabric port 16 by Vbridge 11 in unit 10, the Vbridge 21 within unit 20 receives the multicast stream. Vbridge 21 serves VLAN 1 and so the stream is carried on VLAN 1 between the two devices. Vbridge 21 within unit 2 forwards the stream to the directly connected client C3 and also to the multicast router within unit 20 for replication of the stream and its routing to Vbridge 22. Vbridge 22 then forwards the stream to the directly connected clients C4 and C5.

It is important to note that any replica made by the router in the final or egress unit is not forwarded to a fabric port; it is sent only to the local user port or ports by way of a Vbridge in the egress unit.

Port Forwarding Rules

A unit needs to configure its forwarding engine to forward a multicast stream only to the ports that require it. It must not forward the stream to any other port. In order to achieve this end the unit must combine the router's forwarding tables and the bridge forwarding tables and only forward to a particular port if both tables indicate that the packet should be so forwarded.

In the following there are rules which specify how the bridge multicast forwarding tables and the router multicast forwarding tables should be used to control the forwarding of multicast traffic to both user ports and fabric ports.

User Ports

The rules according to which multicast traffic must be forwarded to a user port are no different for a distributed fabric than for a single unit. They may be directly derived from the requirements of multicast routing and multicast bridging with an associated IGMP snooper. The rules are summarised below in order to provide a comparison with the rules for forwarding of multicast traffic to fabric ports.

For each multicast stream arriving into the fabric on a particular LAN and then for each user port the unit must bridge the stream to the user port if the user port has membership of the same VLAN as the stream's ingress VLAN and this VLAN's Vbridge multicast forwarding table has this user port in the egress for the multicast stream's destination group. Further, for each user port, the unit must route the stream to the user port if the router's multicast forwarding table indicates that the stream should be accepted from its interface to the stream's ingress VLAN; and the router's multicast forwarding table indicates that the stream should be routed to the router interface attached to the same Vbridge as this port; and for the Vbridge forwarding to the VLAN of which the port is a member, the multicast forwarding table has this user port in the egress list for the multicast stream's destination group.

Further, for each multicast stream and then for each user port as aforesaid, where a user port is a member of multiple VLANs, the routing rules must be applied a corresponding multiplicity of times, once for each VLAN of which the port is a member. This may of course result in a multiplicity of replicas of the stream being forwarded to that port.

Fabric Ports

In order to avoid unnecessary usage of the available bandwidth on a fabric link, it is greatly preferred that a device should not replicate or route multicast traffic to a fabric port. Thus all forwarding of multicast traffic to a fabric port needs to be done by bridging.

In order to control further the forwarding of multicast traffic so that it only traverses a fabric link if it be necessary to do so, the bridge should only forward multicast traffic to a fabric port if it would be subsequently forwarded to a user port on another unit.

Figure 11:
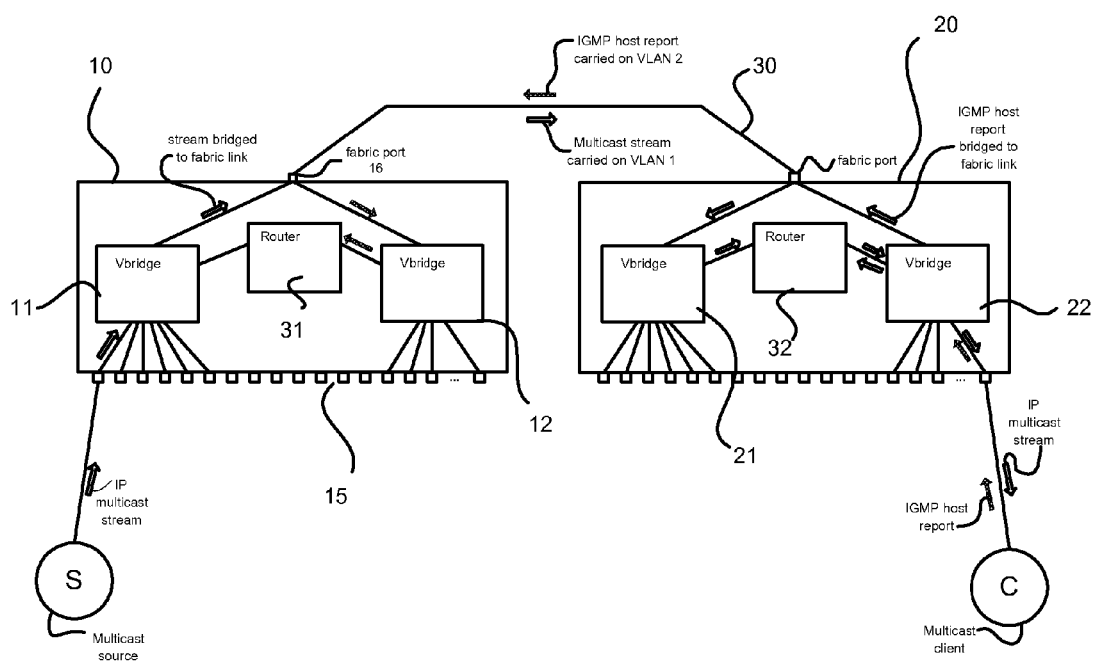
FIG. 11 illustrates the operation of a fabric according to FIG. 10.

The information required to determine whether another unit would forward a stream to a user port would be known without having to interrogate that unit. FIG. 11 illustrates how it might work in practice. The structure shown in FIG. 11 corresponds to that described with reference to FIG. 10 and therefore the individual units will not be described again. Once again however the example shows a multicast source S connected to VLAN 1 on the unit 10 and with a client C of the same stream connected to VLAN 2 on the unit 20.

In order to join the destination group for the stream, the client would need to send an IGMP host report. Vbridge 22 in device 20 would forward this report to the unit's multicast router and also the fabric port. Vbridge 12 in unit 10 would then receive the report and forward it to the router 31.

The control plane of the multicast routers in both units would use the report in the construction of the respective forwarding table in the router. As a result, the forwarding table of each multicast router would include the specification that the stream should be replicated and routed from VLAN 1 to VLAN 2.

The control plane of the router in both units would snoop the IGMP report and would use the report in the construction of the multicast forwarding tables in Vbridge 12. For unit 10, since the host report arrived into the unit through the fabric port 16, the multicast forwarding table for Vbridge 12 would include the specification that the stream would be forwarded to the fabric port.

Because its multicast table for Vbridge 12 includes the fabric port for the stream, unit 10 is able to determine that another unit, which may be reached through the fabric port, must have a client for the stream attached to a local user port on VLAN 2. Unit 10 can also determine, by examination of its multicast router's forwarding table, that the stream should be routed to VLAN 2 by the fabric. By combining this information unit 10 can determine that it must bridge the stream to the fabric port so that unit 20 may route it.

Accordingly, the forwarding rules for fabric ports are as follow:

For each multicast stream arriving into the fabric on a particular VLAN, then for each fabric port:

(a) the unit must bridge the stream to the fabric port if this VLAN's Vbridge multicast forwarding table has this fabric port in the egress list for this multicast stream's destination group;

(b) furthermore, for each fabric port and each multicast stream, the unit must bridge the stream to the fabric port if the router's multicast forwarding table indicates that the stream should be accepted from its interface to the stream's ingress VLAN, and the router's multicast forwarding table indicates that the stream should be routed to any other VLAN and the Vbridge forwarding to at least one of the VLANs to which the stream should be routed has, in its multicast forwarding table, this fabric port in the egress list for this multicast stream's destination group.

Finally, the unit must not route the stream to the fabric port.

These rules may therefore be employed to set up appropriate routing and bridging tables.

Forwarding to Aggregated Links

Each replica of a multicast stream should be forwarded to an aggregated link only once regardless of how many units over which the aggregated link is distributed. Because the bridge controls the aggregated links, this requirement is strictly speaking not directly relevant to the invention. There are various options. For example, it may be provided that a particular unit is nominated to forward multicast traffic to a specified aggregated link. If this option is adopted, any other unit within the fabric port must not forward multicast traffic to user ports that are members of the aggregated link. Alternatively, the forwarding of multicast traffic may be distributed to aggregations according to the unit through which the stream enters the fabric. This option may offer more opportunities for reducing unnecessary usage of fabric links and so would generally be preferable to the previous option.

Control Plane

A multicast router may use available multicast protocols to organise the distribution of multicast streams to those parts of the network that require it. A multicast router employs protocols such as IGMP to determine whether there are any hosts in the directly connected sub-network that may require a multicast stream. It would also use protocols such as PIM (Protocol Independent Multicast) or DVMRP (Distance Vector Multicast Routing Protocol) to determine whether there are other units in the directly connected sub-network that also require the multicast stream. The router then arranges for the multicast streams to be sent to the sub-network to which the host or router is attached. In many circumstances this can result in all the hosts or routers in the sub-network receiving these multicast streams even though only a few hosts in that sub-network desired them. This arises because bridges conforming to IEEE Standard 802.1d are required to flood multicast packets as they would flood broadcast packets along the non-blocking ports of the spanning tree. To reduce the bandwidth that a multicast stream can occupy and to reduce the amount of unwanted traffic that a host sees, the distributed fabric should only direct multicast streams to the user ports which require them. It is preferable that a fabric device only direct multicast streams to other fabric devices that have user ports that require them. For this purpose information on which user ports the multicast packets were received should be available to the receiving devices.

Figure 12:
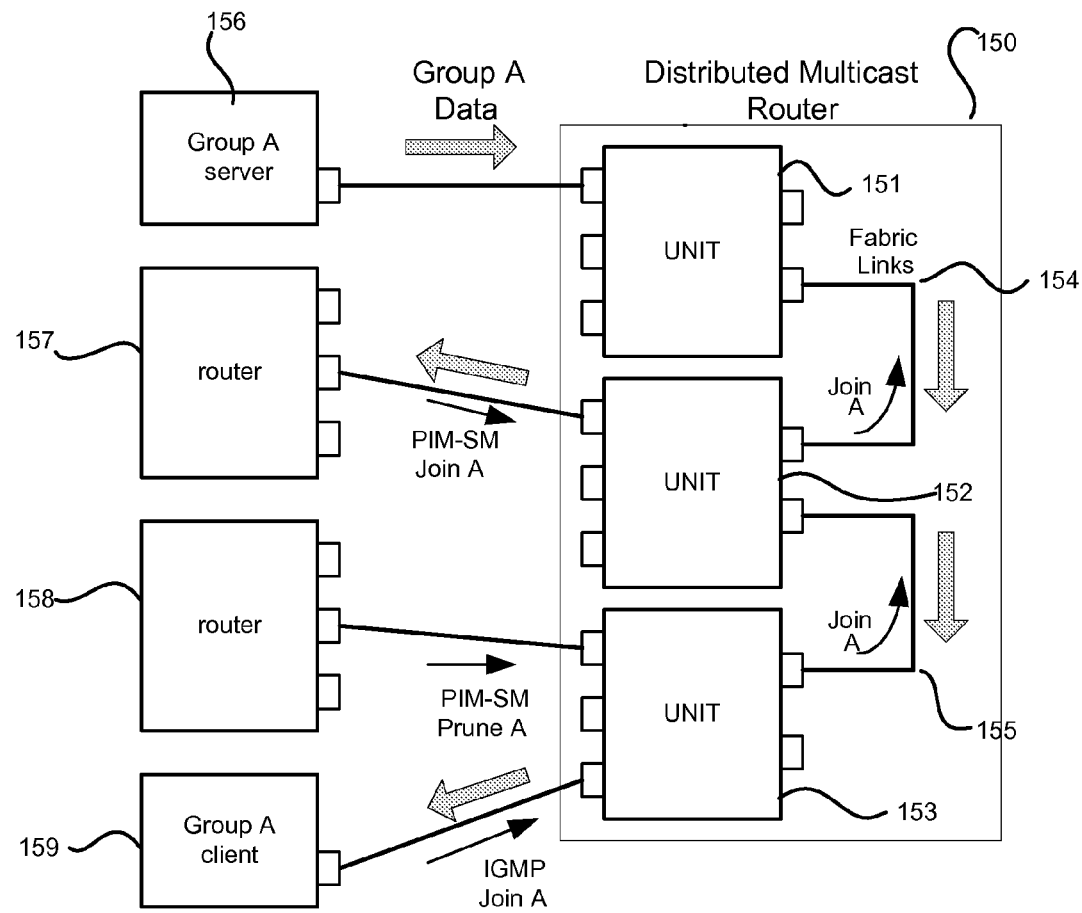
FIG. 12 illustrates further aspects of operation of a distributed multicast router.

An example is shown in FIG. 12. In this device there is a distributed multicast router 150 composed of units 151, 152 and 153 with connecting fabric links 154 and 155. A 'group A' server 156 is connected to a user port on unit 151. A router 157 is connected to a user port on unit 152. A router 158 is connected to a user port on unit 153 and a group A client 159 is also connected to a different user port on unit 153.

In the system of FIG. 12 it may be supposed that router 157 and client 1 are the only network devices that need to receive the multicast stream for multicast group A.

The distributed multicast router receives at unit 151 this multicast stream from the group A server 156 and sends it out only on the physical link from unit 152 to router 157 and the physical link to client 159 from unit 153. Since router 158 does not desire the multicast stream the stream is not sent on the link between unit 152 and router 158. This can be achieved by maintaining port distribution trees from the received PIM-SM and IGMP packets, which will indicate that router 158 should be 'pruned' and client 159 should join group A.

Control Plane Configuration

When a multicast router is deployed an administrator will define the router configuration for the distributed router. This configuration preferably includes but is not limited to the definition of IP interfaces, multicast routing controls, PIM-SM configuration, PIM-DM configuration, DVMRP configuration and IGMP configuration.

For the multicast routers to operate as a single distributed multicast router each defined multicast configuration needs to be identical on all units of the fabric and this configuration should preferably be stored in non-volatile storage on all the units. If a unit with a default configuration joins the fabric it needs to update its configuration to that of the distributed multicast router. If a unit with non-default configuration joins the fabric then a selection mechanism, as previously described, must exist to determine the distributed multicast router configuration. This can be as simple as selecting the lowest numbered unit to provide the configuration or can be more complex employing a priority system. As the configuration of the multicast router is changed it is plain that changes must be made on all the units within the fabric.

Control Protocol Redundancy

The requirements of this are substantially the same as those for the unicast router and will not be described in detail. It is sufficient to indicate that in order that a transition from slave to master should occur quickly and with minimal disruption to both the protocol and the routed traffic, protocol state information and distribution tree information from the master should be synchronised in all the slave units. It should be noted that any synchronisation between units of the routing protocols will consume bandwidth from the fabric interconnect. To minimise the bandwidth used for synchronisation, again the routing protocols may be run on each device.

IGMP

The IGMP protocol enables multicast clients on a sub-network to register with their local routers in order to receive IP multicast streams. This is managed according to the protocol through the exchange of query and report messages between the clients and the router.

Query messages are sent by IP multicast routers to determine the group membership of clients on an attached sub-network. Since according to the invention a distributed router must appear as if it were a single unit to these clients the fabric must not generate duplicate query messages. Again, this can be achieved by the election of a single unit as the source of queries for the fabric. It can be assumed that query messages received by the distributed router are forwarded to all user ports of the ingress VLAN. This will allow other clients and routers attached to the sub-network to receive the messages.

Report messages can be generated by the client units in order to route query messages or a change in an applicant's multicast membership. Changes in the multicast membership reported may affect the multicast distribution tree that the router maintains. Any changes to the multicast distribution tree must be kept synchronised for all the units in the fabric. One possibility is to cause merely one unit to process the IGMP report and to send updates to the remainder of the units in the fabric. Alternatively the IGMP message could be delivered to every unit in the fabric for processing.

We claim:

1. A distributed router for multicast packets, comprising:
   a fabric composed of a multiplicity of units each having respective user ports and at least one fabric port, and internal fabric links between fabric ports, said fabric constituting a single network node;
   wherein each unit includes at least one bridge connected to at least one of the respective user ports and to each fabric port of the unit and further includes at least one router connected to said bridge;

wherein a unit which receives multicast packets intended for forwarding from another unit in the fabric bridges those multicast packets to a fabric port of this unit; and wherein a unit having a local user port or ports from which said multicast packets are to be forwarded replicates said multicast packets as necessary and routes said multicast packets to said local user port or ports.

2. A distributed router according to claim 1 wherein each unit includes a bridge for each of a plurality of domains and on receipt of multicast packets pertaining to a particular domain bridges those packets on said particular domain.

3. A distributed router according to claim 2 wherein the domains are virtual local area networks (VLANs).

4. A distributed router according claim 1 wherein each unit includes forwarding rules that prescribe the forwarding of a given packet to a given fabric port if the unit has available information which indicates that another unit connected to said given fabric requires that given packet.

5. A network unit for use in a fabric of units capable of distributed multicast routing wherein the fabric presents only one routing hop between ingress of multicast packets to the fabric and egress of said packets from the fabric, said network unit comprising:
- a multiplicity of user ports for connection to an external network;
- at least one fabric port for connection to another unit in the fabric;
- at least one bridge connected to at least some of said user ports and to each fabric port; and
- a router interlaced with said bridge;

wherein said unit is organized on receipt of multicast packets intended for forwarding from another unit in the fabric to bridge those multicast packets to a fabric port of this unit; and wherein said unit is organized, on receipt at a fabric port of multicast packets intended for forwarding from user port or ports of said unit, to replicate said multicast packets as necessary and to route said multicast packets to said local user port or ports.

6. A network unit according to claim 5 wherein said unit has a multiplicity of bridges each connectable to at least some of said user ports and connected to each fabric port, each bridge pertaining to a respective bridging domain.

7. A network unit according to claim 6 wherein each domain is a virtual local area network.

8. A network unit according to claim 5 wherein the unit has forwarding rules that prescribe the forwarding of a given packet to a given fabric port if the unit has available information which indicates that another unit connected to said given fabric requires that given packet.

9. A method of routing multicast packets in a fabric of network units, comprising:
- receiving multicast packets at an ingress unit in the fabric;
- bridging said packets across the fabric to an egress unit;
- replicating said multicast packets as necessary in said egress unit; and
- routing said multicast packets in said egress unit, whereby said packets cross said fabric only once each.

* * * * *